UNITED STATES PATENT OFFICE.

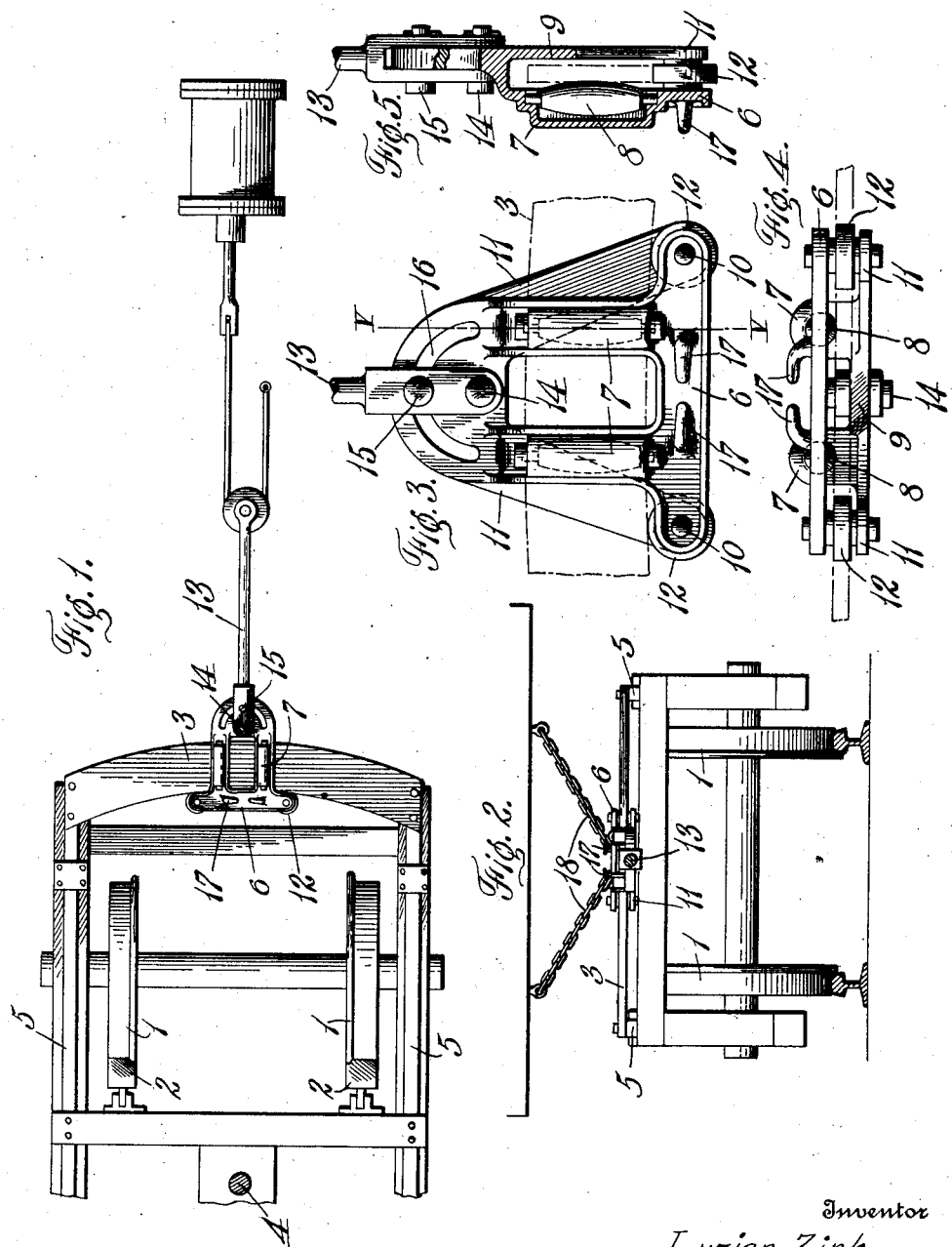

LUZIAN ZINK, OF DETROIT, MICHIGAN.

BRAKE-SHOE CONTROL.

1,038,059. Specification of Letters Patent. Patented Sept. 10, 1912.

Application filed December 29, 1911. Serial No. 668,403.

*To all whom it may concern:*

Be it known that I, LUZIAN ZINK, a citizen of the United States of America, residing at Detroit, in the county of Wayne and State of Michigan, have invented certain new and useful Improvements in Brake-Shoe Control, of which the following is a specification, reference being had therein to the accompanying drawings.

This invention relates to a brake shoe control for railway cars and more especially to an arrangement thereof adapted for use on cars with swivel trucks or bogies whereby the angular motion of the truck relative to the car body does not effect the application of power to the brake shoes and whereby the power applying means is safe from accident in case of a partial break down or abnormal displacement of the truck due to splitting a switch or the like.

The invention consists in the matters hereinafter set forth and more particularly pointed out in the appended claims.

In the drawings, Figure 1 is a plan view, partially broken away, of a truck provided with mechanism that embodies features of the invention with centering means omitted; Fig. 2 is a view in end elevation of the truck and applied mechanism; Fig. 3 is a plan view, enlarged and in detail, of a circle bar yoke; Fig. 4 is a view in end elevation of the yoke; and Fig. 5 is a view in section on line V—V of Fig. 3.

Referring to the drawings a pair of truck wheels 1 is equipped with brake shoes 2 which may be forced against them through power applied to what is termed a circle bar 3 having a center of curvature coincident with that of the pivot pin 4 of the truck. The connections between the circle bar 3 and the brake shoes 2 are of any preferred type and are merely indicated herein as at 5.

A yoke preferably formed integrally of forged metal, cast steel or like suitable matter consists of an upper roller plate 6 having pockets 7 in which friction rolls 8 are journaled to ride on the circle bar 3, and a lower keeper plate 9 underlying the circle bar 3. In preferred form the upper bearing plate 7, which is suitably ribbed and flanged to combine strength with lightness, is connected at its end portions by pivot bolts 10 to the divergent arms 11 of the keeper plate. Draft rollers 12 are journaled on the pivot bolts to travel on the concave marginal portion of the circle bar. A draft rod 13 has a forked end embracing the forward semicircular portion of the yoke to which it is coupled by a pivot pin 14 and a guard pin 15 traveling in a segmental slot 16 in the yoke. The outer end of the draft rod 13 is connected in any well known manner to the operating member of an air brake system or to the hand wheel of an ordinary brake. Preferably the rollers 8 are slightly crowned to allow them to rock freely on the circle bar surface. Projections or hooks 17 on the upper surface of the yoke are engaged by chain hangers 18 or other suitable means secured to the body of the car above the truck for holding the yoke in central position relative to the car body. As a result of this construction power may be applied through the yoke to the brakes regardless of the angular position of the truck in relation to the car body within the ordinary range of motion under usual conditions. In case a car leaves the track or the truck splits a switch, the yoke assists in limiting the angular deflection of the truck. If either of the pins coupling the draft rod to the yoke is displaced or broken, the companion pin retains the parts in proper position. If one of the draft roller journals breaks, the yoke merely swings around a slight distance and performs its proper function through the medium of the remaining draft roller.

Obviously, changes in the details of construction may be made without departing from the spirit of the invention and I do not care to limit myself to any particular form or arrangement of parts.

I claim:

1. The combination with brake shoes and a circle bar operatively connected thereto, of a yoke embracing the bar and having friction rollers traveling on the upper face thereof, draft rollers journaled on the yoke in contact with the concave marginal portion of the circle bar, and a draft rod pivotally secured by a double connection to the forward portion of the yoke.

2. The combination with brake shoes and a circle bar for operating the brake shoes, of a yoke embracing the circle bar, friction rollers journaled in the upper portion of the yoke to travel on the upper face of the bar, draft rollers journaled in the yoke to bear against the concave marginal portion of the bar, a draft rod embracing the forward portion of the yoke, a pivot pin connecting the yoke and draft bar, and a guard pin in the draft bar loosely engaging the yoke.

3. The combination with brake shoes and a circle bar for operating the shoes of a yoke having a roller plate overlying the bar and a keeper plate underlying the bar, draft rollers journaled in the roller plate in contact with the upper face of the bar, a pair of draft rollers each journaled between the adjacent end portions of the roller plate and keeper plate in contact with the concave marginal portion of the circle bar, a draft rod embracing the forward portion of the yoke, a pivot pin connecting the rod and yoke and a guard pin in the draft rod playing in a slot in the yoke.

4. The combination with a bogie truck, brake shoes thereon and a circle bar for operating the brake shoes having its center of curvature co-incident with the pivotal center of the truck, of a yoke embracing the circle bar with friction and draft rollers bearing on the faces of the bar, a draft rod pivotally connected to the yoke, and centering means for suspending the yoke from a point above the circle bar.

5. The combination with brake shoes and a circle bar for operating them, of a yoke embracing the circle bar and consisting of an upper roller plate and a lower keeper plate integrally connected thereto with divergent arms extending to the outer extremities of the roller plate, draft rollers journaled in pockets in the under face of the roller plate to travel on the proximate face of the circle bar, pivot pins coupling the arms of the keeper plate and adjacent portions of the roller plate, draft rollers each journaled on a pivot pin in contact with the adjacent concave marginal face of the circle bar, a draft bar, a pivot pin connecting the draft bar and yoke and a guard pin in the draft rod traveling in a slot in the yoke.

6. The combination with a bogie truck, brake shoes thereon, a circle bar having a center of curvature coincident with the pivot center of the truck, and operating connections between the circle bar and brake shoes, of a yoke riding on the circle bar and having a roller plate overlying the bar and a keeper plate underlying the bar, rollers loosely journaled in pockets in the roller plate to bear against the upper face of the circle bar, draft rollers journaled between the end portions of the roller and keeper plates in contact with the concave marginal face of the circle bar, a draft rod pivotally connected at the forward portion of the yoke to swing in the plane of the circle bar and centering means attached to the roller plate and adapted to be secured to points of support above the circle bar.

7. The combination with a truck, brake shoes on the truck and a circle bar having a center of curvature coincident with the pivot center of the truck, of a yoke embracing the bar and having friction bearings and draft elements in rolling contact with the circle bar, and a draft rod pivotally secured to the forward portion of the yoke.

8. The combination with a truck, brake shoes on the truck and a circle bar having a center of curvature coincident with the pivot center of the truck, of a yoke traveling on the circle bar, friction elements in the yoke rolling on the bar, a pair of draft members on the yoke in rolling contact with the concave marginal face of the bar, and a draft bar pivoted to the forward part of the yoke.

In testimony whereof I affix my signature in presence of two witnesses.

LUZIAN ZINK.

Witnesses:
C. R. STICKNEY,
ANNA M. DORR.

---

Copies of this patent may be obtained for five cents each, by addressing the "Commissioner of Patents, Washington, D. C."